Dec. 8, 1959  H. D. HUME  2,915,870
FLOATING CUTTER BAR SUPPORT MOUNTING
Filed March 27, 1958  3 Sheets-Sheet 2

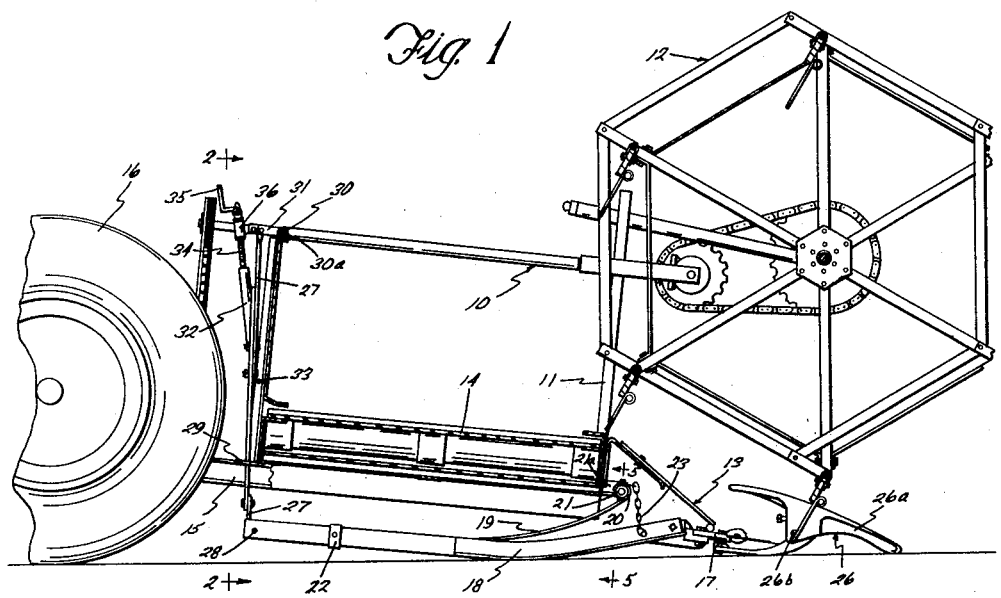

INVENTOR.
Horace D. Hume
BY
Atty.

Dec. 8, 1959  H. D. HUME  2,915,870
FLOATING CUTTER BAR SUPPORT MOUNTING
Filed March 27, 1958  3 Sheets-Sheet 3

INVENTOR.
Horace D. Hume.
BY
Seeh Wells
Atty.

United States Patent Office 2,915,870
Patented Dec. 8, 1959

2,915,870

FLOATING CUTTER BAR SUPPORT MOUNTING

Horace D. Hume, Mendota, Ill.

Application March 27, 1958, Serial No. 724,426

2 Claims. (Cl. 56—208)

The present invention relates to improvements in support means for floating cutter bars.

In the prior Patent No. 1,996,294, granted April 2, 1935, to James E. Love and myself, there is shown a cutter bar and supporting mechanism therefor wherein the cutter bar is mounted for limited movement up and down with respect to the harvester frame upon rearwardly extending curved supporting shoes, and leaf springs are provided between the harvester frame and the supporting shoes to substantially float the cutter bar with respect to the harvester frame. This type of floating support means has been found very satisfactory for harvesting down or fallen grain, and such crops as peas, beans and the like where it is necessary to cut very close to the ground, and where it is necessary to utilize crop lifting guards on the cutting mechanism to travel along the ground in front of the cutter bar and lift the crop for cutting.

I have found that support means such as those disclosed in the patent mentioned above are particularly useful in windrow harvesters supported on tractor vehicles in the manner disclosed in my prior Patent No. 2,603,054, granted July 15, 1952. Machines such as this are well adapted for harvesting vine and vegetable crops or other crops which lie upon or close to the ground.

When a floating cutter bar is utilized on such a harvester in combination with crop lifting guards several problems arise. For proper operation, the crop lifting guards must engage with and ride directly upon the ground. The cutter bar supporting shoes or runners must also engage with and ride upon the ground. In order to maintain both the shoes and the lifter guards in ground engagement, it is necessary that the shoes be maintained in substantially unchanged relation with the ground during the harvesting operation. As illustrated in Patent No. 1,996,294, the supporting shoes are pivoted at their rear ends to support means depending from the rear edge of the header frame of the harvester. Only so long as said rear edge remains a fixed distance above the ground, will the shoes and lifter guards remain in proper ground engagement.

Under normal circumstances this distance will remain fixed so long as the header is carried the proper distance above the ground. However, should the distance from the rear edge of the header to the ground be changed, as for example by sinking of the tractor wheels in moist or muddy ground, then the rear ends of the shoes or runners will be lowered, and the shoes will be rocked about their ground engaging portions to lift the lifter guards above the ground and render them ineffective. To re-establish proper shoe-to-ground relation, it is necessary to adjust the rear ends of the shoes on their support means. With the mechanism disclosed in Patent No. 1,996,294, each shoe must be adjusted separately at a considerable expense of time and labor.

It is the principal purpose of this invention to provide support means for floating cutter bar supporting shoes operable by a single control element to raise or lower the rear ends of all the supporting shoes simultaneously to readjust the shoes to compensate for changes in the level of the rear edge of the harvester frame above the ground.

It is a further purpose of the invention to provide such supporting means wherein the control element is capable of manipulation in the field without the aid of any tool and without necessitating disassembly of any part of the device.

These and other objects and advantages of my invention will appear more clearly from the following description and the accompanying drawings wherein a preferred form of the invention is shown. It should be understood that the drawings and description are merely illustrative, however, and are not intended to limit the invention except insofar as it is limited by the claims.

In the drawings:

Figure 1 is a fragmentary elevational view of a harvester embodying my invention, showing a portion of a tractor to which the harvester is attached;

Figure 2 is a transverse sectional view taken on the line 2—2 of Figure 1, with the reel left off for the sake of clarity;

Figure 7:
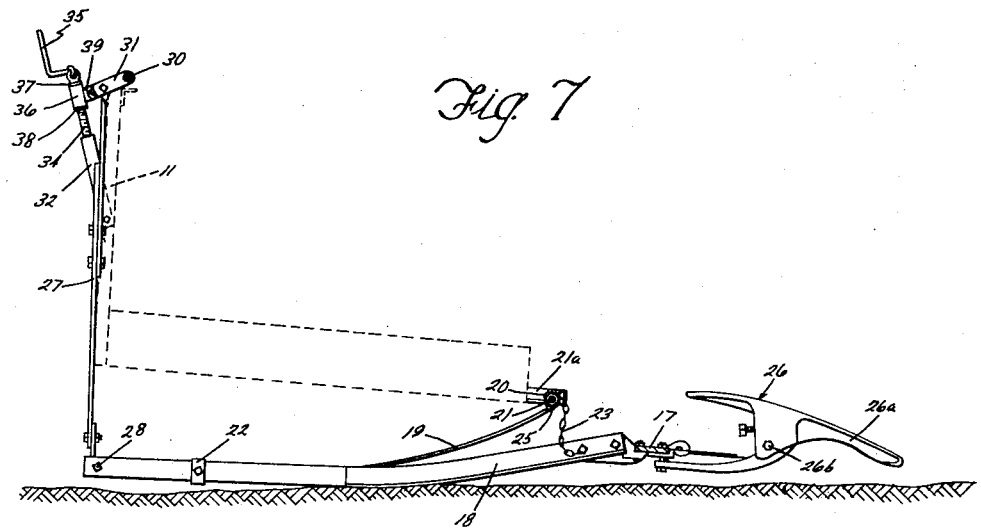
Figure 8:
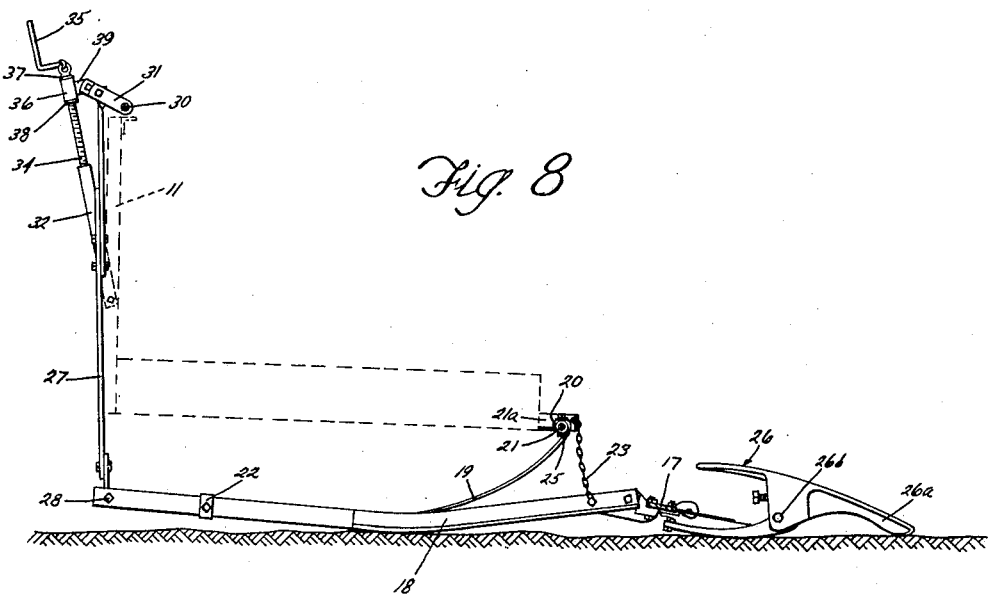

Figure 7 is a somewhat diagrammatic view with parts in section of a cutter bar supporting shoe and support means therefor, showing the shoe tilted back from its proper position by lowering of the harvester with respect to the ground from the normal position shown in Figure 1, as would occur when the tractor wheels sink in soft or muddy ground; and Figure 8 is a view with parts in section similar to Figure 7, but showing the shoe adjusted to proper position by means of my invention.

Referring now in detail to the drawings, I have shown in Figure 1 a push type windrow forming harvester generally indicated at 10 which comprises a framework 11 that mounts a reel 12, a floating cutter mechanism 13, and a transverse windrow forming draper 14. The harvester 10 is supported by support means 15 pivoted behind the harvester 10 to a tractor or other powered vehicle partially indicated at 16. The support means 15 are not shown in detail since they are old, as evidenced by U.S. Patent No. 2,603,054 mentioned hereinbefore. The support means 15 mount the harvester 10 for limited vertical movement about a horizontal transverse axis spaced rearwardly of the harvester 10.

Figure 5:
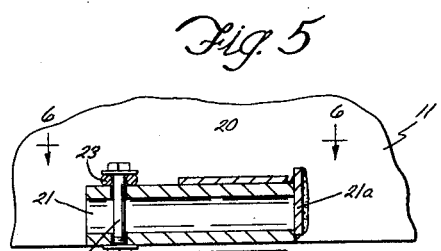
Figure 5 is an enlarged fragmentary sectional view taken on the line 5—5 of Figure 1.
Figure 6:
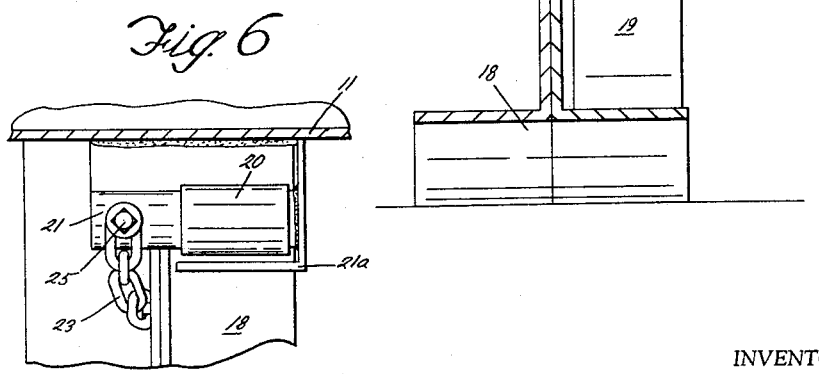
Figure 6 is a sectional view taken on the line 6—6 of Figure 5.

The floating cutting mechanism 13 is of the type disclosed in U.S. Patent No. 1,996,294, mentioned above, and comprises a cutter bar and sickle mechanism 17 carried by a plurality of longitudinally extending shoes or runners 18. As illustrated in the drawings, the shoes 18 are curved so that they engage the ground at points spaced rearwardly from the cutter bar and sickle mechanism 17 and support the mechanism 17 a short distance above the ground. The supporting shoes 18 are pivotally secured to the frame 11 of the harvester 10 at their rearward ends by means described in detail hereinafter. The supporting shoes 18 are supported for substantially weightless floating movement beneath the frame 11 by leaf springs indicated at 19 in the drawings. The leaf springs 19 have hooked portions 20 at their forward ends that are engaged with and freely pivoted on transverse shafts 21, as best illustrated in Figures 5 and 6. The shafts 21 are supported on brackets 21a at the forward end of the harvester framework 11. The leaf springs 19 curve downwardly and are secured to the shoes 18 by adjustable clips 22. By moving the clips 22 toward or away from the free ends of the leaf springs 19, the supporting force of the springs 19 may be varied as desired. The clips 22 are normally adjusted so that the springs 19 counterbalance most of the weight of the cutting mechanism and so that the shoes 18 ride lightly against the ground. Safety chains 23 are provided between the forward ends of the shoes 18 and the framework 11 to prevent the shoes 18 from dropping into holes or ditches which the harvester may pass over. The safety chains 23 are bolted to the transverse shafts 21 by bolts 25, as best shown in Figure 5. The bolts 25 serve the dual purpose of mounting the safety chains 23 and of preventing the springs 19 from moving endwise off of the shafts 21.

As illustrated in Figures 1, 7 and 8, the floating cutting mechanism 13 includes crop lifting guards 26. The guards 26 are bolted to the cutter bar and sickle assembly 17 and extend forwardly therefrom. The guards 26 are intended to ride upon the ground in front of the cutter bar 17 to engage and lift crops lying on or near the ground level. The guards 26 include nose portions 26a which are pivoted on pins 26b so that they can follow exactly the ground contour and pick up all of the crop.

For proper operation of the floating cutting mechanism 13 it is essential that the relationship between the supporting shoes 18, the crop lifting guards 26, and the ground remain substantially unchanged during the harvesting operation. That is to say, both the crop lifter guards 26 and the supporting shoes 18 should be in engagement with the ground. This can only be accomplished if the particular angular relation between the supporting shoes 18 and the ground shown in Figure 1 remains constant. If, for any reason, the rear ends of the supporting shoes 18 are lowered with respect to the ground, the shoes 18 will rock about the curved ground engaging portion and lift the cutter bar 17 and crop lifting guards 26 above the ground so that part of the crop will be missed. If, on the other hand, the rear ends of the shoes 18 are raised from the position shown in Figure 1, the shoes 18 will be lifted from the ground and too much force will be placed on the crop lifting guards 26. As hereinbefore stated, the proper shoe-to-ground relation will only exist so long as the rear edge of the framework 11 of the harvester 10 remains a fixed distance above the ground. Under normal circumstances, this distance will remain fixed so long as the harvester 10 is carried at the proper height above the ground. However, should the rear edge of the framework be lowered, as for example by sinking of the tractor wheels into the ground in a moist or muddy field, then the rear edges of the shoes 18 would also be lowered, causing the shoes 18 to rock back about their ground engaging portions as shown in Figure 7 and lift the guards 26 above the ground.

This undesirable situation can only be rectified by changing the relation between the rear ends of the shoes 18 and the framework 11 to bring the shoes 18 back to proper position with respect to the ground. While it would appear that elevation of the harvester 10 with respect to the tractor 16 to compensate for the sinking would correct the situation, this is not true, for the reason that elevation of the harvester 10 causes tilting of the framework 11 above the axis at which the support mechanism 15 is pivoted to the tractor. Thus, when the harvester 10 is raised to bring the front edge back to proper cutting height, the rear edge is not raised the same distance, and the proper shoe-to-ground relation is not restored.

The object of this invention is to provide means for supporting the rear ends of the several supporting shoes for simultaneous movement up or down with respect to the framework 11 by simple manipulation of a single control element. To accomplish this, I provide at the rear end of each shoe 18 a vertically movable strap or supporting link 27, best shown in Figures 2 and 3. The shoes 18 are pivotally mounted to the links or straps 27 by pivot pins 28 and supported thereby. The straps 27 are slidably received in brackets 29 fixed to the lower rear edge of the framework 11. The brackets 29 support the straps 27 against rearward movement, and transmit the rearward thrust of the cutting assembly to the framework 11.

At the top of the framework 11, above the rear edge thereof, a transverse shaft 30 is journalled. The shaft 30 is supported in bearings 30a mounted upon the framework 11. The shaft 30 has a plurality of radial lever arms 31 secured thereto and extending rearwardly therefrom. There are as many levers 31 as there are straps 27, and each strap 27 is pivoted to one of the lever arms 31. It will be seen that with the construction just described, rotation of the shaft 30 in a direction to pivot the lever arms 31 upwardly will cause the rear ends of all the shoes 18 to be moved upwardly with respect to the framework 11. Rotation of the shaft 30 in the opposite direction will cause the rear edges of all the shoes 18 to be moved downwardly with respect to the framework 11.

Figure 3:
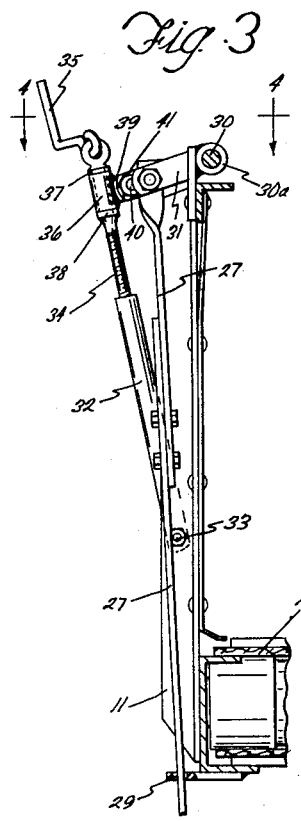
Figure 3 is an enlarged fragmentary sectional view taken on the line 3—3 of Figure 2.
Figure 4:
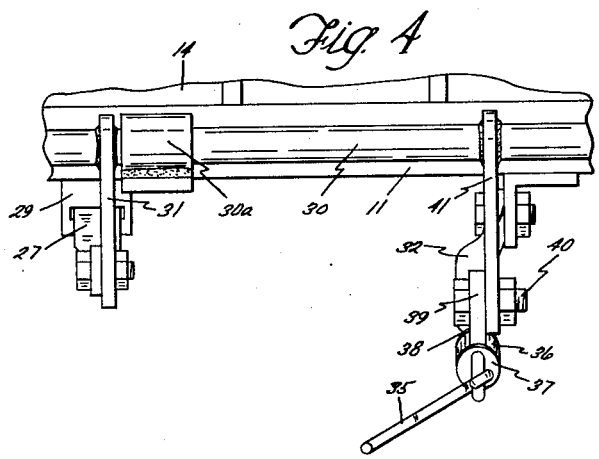
Figure 4 is a further enlarged fragmentary plan view looking in the direction of the arrows 4—4 of Figure 3.

In order to rotate the shaft 30 selected amounts, and to maintain it in adjusted position, a control and lock mechanism is employed. As best shown in Figures 2 and 3, this mechanism comprises a tubular internally threaded sleeve 32 pivoted at one end to the framework 11 by a bolt 33 below the shaft 30, and having a threaded shaft or screw 34 threaded into its opposite end. The shaft 34 is provided with a crank handle 35 at its free end by which it can be rotated in either direction to thread it into or out of the sleeve 32. The shaft 34 has a collar 36 rotatably but non-slidably mounted thereon between fixed enlarged portions 37 and 38. The collar 36 has an ear 39 thereon which is pivoted by a pivot pin 40 to a lever 41 fixed on the shaft 30. It will be readily understood that by rotation of the threaded shaft 34 through manipulation of the handle 35 to move the threaded shaft 34 into or out of the sleeve 32, the collar 36 can be moved up or down relative to the framework 11 to rotate the shaft 30 selected amounts. Once the desired position is reached, the shaft 30 is locked in position and will not be casually moved in one direction or another by vibration or other causes during operation of the harvester 10.

It should be apparent from the foregoing that my invention provides a unique support means for the supporting shoes or runner 18 of the floating cutting mechanism 13 of the harvester 10 which is operable by the simple manipulation of the single crank 35 to adjust all of the shoes 18 simultaneously to proper ground engaging position. Figures 7 and 8 best illustrate the operation of the invention. In Figure 7 the shoes 18 are shown in rocked back position caused by lowering of the harvester 10 and its supporting mechanism, as by sinking of the tractor wheels in soft ground. Figure 8 illustrates the shoes in proper position after the harvester frame has been raised on the tractor to the proper cutting height, and after the rear ends of the shoes 18 have been raised with respect to the framework 11 to bring them into proper relation with the ground.

It will be noted that the adjustment of the shoes 18 by means of my invention does not affect the "floating" adjustment thereof; that is to say, the tension of the leaf springs 19. The springs 19, being loosely pivoted to the shafts 21, merely pivot thereon as the shoes 18 are adjusted, and the tension (controlled by placement of the clips 22) remains unchanged.

While I have used the event of sinking of the tractor wheels in soft or muddy ground as an example of a circumstance requiring adjustment of the shoes 18 with the frame 11, it will be apparent that my invention is useful in other instances also. Readjustment of the shoes with the framework 11 becomes necessary each time the height of the harvester frame 11 above the ground is altered for any reason.

It is believed that the nature and advantages of my invention appear clearly from the foregoing.

Having thus described my invention, I claim:

1. Means for mounting a cutter bar supporting shoe to a harvester frame for controlled movement toward and away from the frame comprising a vertical strap pivoted to the shoe and extending upwardly therefrom, guide means on the frame supporting said strap against horizontal movement, a shaft journalled on the frame above the shoe, lever arm means fixed on the shaft and extending radially therefrom, said strap being pivoted to the lever arm means and movable vertically thereby upon rotation of the shaft, second lever means fixed to said shaft, a collar pivoted on said second lever means, a threaded shaft member rotatably but non-slidably supported in said collar, means connected to said shaft member to rotate the shaft member and an internally threaded sleeve pivoted to the harvester frame, said shaft member being threaded into said sleeve and operable upon rotation to move into and out of the sleeve to pivot the second lever means selected distances whereby to raise and lower the shoe with respect to the frame.

2. In a harvester having a frame, a cutter bar in front of said frame, spaced apart ground engaging shoes carrying said cutter bar and extending rearwardly from said bar beneath the frame with their rear ends pivotally supported on the frame and springs suspended on the frame and connected to the shoes between the cutter bar and the rear ends of said shoes operable partly to support the shoes and cutter bars, a shaft pivoted on said frame above the rear ends of said shoes and means supporting the rear ends of said shoes from said shaft comprising links carrying the rear ends of said shoes, lever arms fixed on said shaft and pivoted to the links, a lever fixed to the shaft, a screw rotatably mounted on said lever, a member fixed on the frame into which said screw is threaded and a crank handle on said screw for rotating it.

References Cited in the file of this patent

UNITED STATES PATENTS

| | | |
|---|---|---|
| 1,996,294 | Hume et al. | Apr. 2, 1935 |
| 2,638,728 | Balzer et al. | May 19, 1953 |
| 2,720,744 | Ashton et al. | Oct. 18, 1955 |
| 2,817,942 | Collins et al. | Dec. 31, 1957 |